Sept. 29, 1936.    F. L. WOLF    2,055,832
CURRENT COLLECTOR
Filed Oct. 11, 1935

Fred L. Wolf Inventor

By Attorney

Patented Sept. 29, 1936

2,055,832

UNITED STATES PATENT OFFICE 2,055,832

CURRENT COLLECTOR

Fred L. Wolf, Mansfield, Ohio, assignor to The Ohio Brass Company, Mansfield, Ohio, a corporation of New Jersey Application October 11, 1935, Serial No. 44,542

10 Claims. (Cl. 191—59.1)

My invention relates to current collectors of the sliding or shoe type for collecting current from a trolley wire.

During the past few years it has been found through experiment and observation of actual operating conditions that if with the shoe or sliding type of current collector the trolley wire can be properly lubricated either by means of the shoe per se or by separate means, as for instance, a lubricating mechanism properly designed for applying lubricant to the trolley wire without regard to the current collector, that materially improved operation and life of the parts may be secured.

My invention resides in the new and novel construction, combination and relation of the parts herein described and set forth in the drawing accompanying this specification.

In the drawing:—

Figure 1:
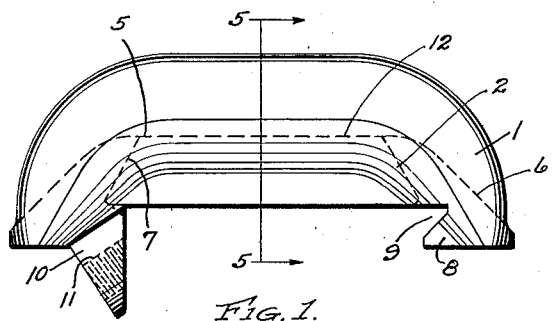
Fig. 1 is a side view of my invention.
Figure 2:
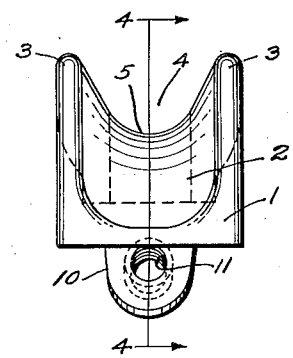
Fig. 2 is an end view of my invention shown in Fig. 1.
Figure 4:
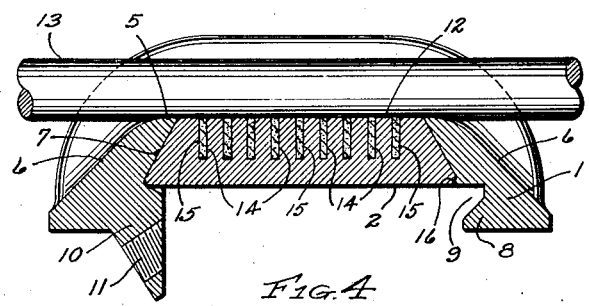
Fig. 4 is a longitudinal section taken on the line 4—4 of Fig. 2.

Shoes in the past have been made as a single element and of various metals.

Later shoes were made of various metals with an insert therein of a dissimilar metal having in view increasing the life of the shoe and reducing wear upon the trolley wire and supports.

In my invention I have provided a shoe with an insert which carries with it lubricating material thus avoiding the use with the shoe of an expensive apparatus for applying the lubricating material to the wire or the use of a vehicle especially equipped with expensive lubricating apparatus for applying the lubricant to the wire without regard to other vehicles using shoes.

In the preferred embodiment of my invention I provide a body member 1 made preferably of copper or bronze, either cast or forged. However, the body may be made of some form of ferrous metal. Combined with the body 1 is an insert 2.

The body 1 comprises an elongated member with upstanding flanges 3 forming a groove 4 with the bearing surface 5 at the ends to engage with the trolley wire. The end surfaces 6 of the body slope downwardly to permit the shoe to pass along the trolley wire as smoothly as possible when meeting obstructions such as the overhead supporting devices for the trolley wire.

The body 1 is also provided with a slot 7 in which is positioned the insert 2. The slot 7 may take on various forms but the form which I have shown is of elongated, rectangular shape with tapered ends and substantially straight and parallel sides. The slot 7 opens into the groove 4 and is also open at the under side of the body to receive the insert from below.

The body 1 is further provided with means for attaching it to a support and I have shown the body provided with a hook 8 at one end forming a transverse slot 9 and a depending lug 10 at the other end and with a threaded opening 11 to receive an attaching screw. The slot 9 interlocks with a cooperating projection on the support and the screw extending through the threaded opening 11 engages with the support thus detachably holding the shoe in place.

The insert 2 is made preferably of a ferrous metal although it may be made of bronze or copper or other non-ferrous metal if desired. The shape corresponds with the shape of the slot 7 and the upper surface 12 of the insert forms the largest portion of the surface of the groove 4 contacting with the trolley wire 13. The surface 12 of the insert is extended longitudinally by the end surfaces 5 of the body 1.

The insert is provided with a plurality of transversely extending spaced slots or recesses 14 for the purpose of receiving and retaining lubricating material 15 in contact with the trolley wire. The lubricating material may be of a solid such as a graphite, or a mixture of graphite with a binder, or hard grease, or it may be a liquid such as a heavy oil.

Figure 3:
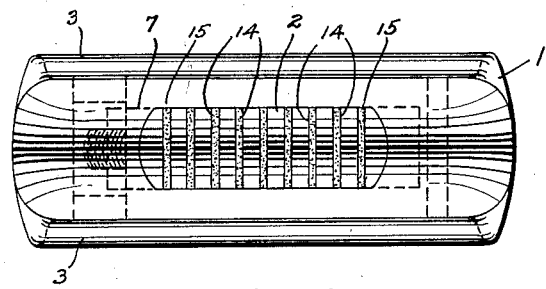
Fig. 3 is a top view of my invention.

I have shown the recesses 14 as extending entirely across the insert but it is evident that they may extend only part way across the insert and thus be closed at the ends, producing a pocket or recess open on the upper surface of the insert only. It is also evident that the recesses 14 may be obliquely disposed to or parallel with the longitudinal axis of the shoe instead of normal to the axis as shown in Fig. 3. It will also be clearly evident that the recesses may consist of a plurality of spaced holes drilled into the insert preferably from the upper side.

Figure 5:
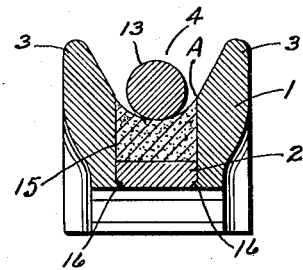
Fig. 5 is a transverse section taken on the line 5—5 of Fig. 1.

There is an advantage in having the slots 14 extend entirely across the insert, namely, a better distribution of the lubricating material is secured as the shoe does not always run central with the trolley wire and very often the wear may take place to one side of the longitudinal center as at or adjacent the point A (Fig. 5). Also a slot extending entirely across the insert is easier to produce than one closed at the ends.

If the lubricating material 15 is of a dry character such as graphite alone or mixed with a very small quantity of binder such as tallow or varnish, I find it advisable to then force the material into the recesses under pressure and in that case the recesses may be formed in the insert 2 extending entirely through the insert from the upper to the lower surface as the insertion of the lubricating material in the pockets under pressure will insure the material remaining in position.

By making the insert 2 of a ferrous metal such as high carbon or alloy steel and then preparing the slots or receptacles therein, I am then able to harden the same and secure the benefits derived from a hard ferrous insert with a body of softer metal.

The insert is usually prepared from bar stock or forged to shape. In the disclosure I have shown the insert is held in place by peening over the edge of the body, as at 16, or the edges may be fused together as by an electric arc using a carbon electrode.

I use the term "slot" to describe the opening 7 in the body 1 for the insert 2 and it may extend entirely through the body or only partially through.

I use the term "recess" to describe the slots 14 in the insert 2, open or closed on the ends, or extending entirely through the insert from its upper face to its lower face, or referring to drilled holes part way or entirely through the insert.

Having clearly set forth my invention and knowing that modifications will suggest themselves to those skilled in the art, I wish to be limited only by my claims.

I claim:—

1. A current collector shoe having upstanding spaced flanges forming an elongated groove with an elongated contact surface to engage a trolley wire, comprising a body having an elongated slot opening into the groove, a separately formed insert positioned in the slot and having an exposed surface forming a portion of said contact surface, transversely disposed receptacles formed in said insert to the full width of the insert and opening onto said contact surface for the reception of a lubricant for the trolley wire, means to hold the insert in the slot and a transverse hook at one end of the body to coact with means on a support and a threaded boss on the other end to receive holding means to detachably secure the shoe to the support.

2. A current collecting shoe having an elongated grooved contact surface to engage a trolley wire comprising a body of metal, a separately formed insert of metal secured to the body and having a surface forming a portion of the said contact surface, recesses formed in the insert extending the width of the insert and opening onto the said contact surface and lubricating material positioned in said recesses and forming part of the said contact surface with alternately and transversely disposed sections of metal and lubricant.

3. A current collecting shoe comprising a body of metal having an elongated contact surface to engage a trolley wire, a separately formed metal insert positioned within the body and having an exposed surface forming part of the said contact surface, transversely disposed and spaced recesses formed in the insert to the full width of the insert and opening onto the said contact surface to receive and retain a lubricant for application to the trolley wire.

4. An insert having a trolley engaging contact surface comprising an elongated bar of metal for insertion in a slot in a current collector body and having transverse slots for the full width of the insert forming recesses for lubricating material.

5. An insert having a trolley engaging contact surface comprising an elongated bar of metal for insertion in a slot in a current collector body and having transverse slots the full width of the insert forming recesses and a solid lubricating material fixedly secured in the recesses to form part of said contact surface.

6. An insert having a trolley engaging contact surface comprising an elongated bar of metal for insertion in a current collector body having substantially parallel side faces and end faces inclined towards each other, a plurality of spaced transverse recesses the full width of the insert and opening onto said contact surface and lubricating material reposing in said recesses and forming a part of said contact surface.

7. The method of manufacturing a current collector shoe having a contact surface to engage a conductor which comprises forming a shoe body of metal, providing a slot opening onto the contact surface, then forming a metal insert with transverse slots for the width of the insert and opening onto the contact surface and filling the recesses with a solid lubricant, then positioning the insert in the slot with one surface of the insert metal and the exposed surface of the lubricant forming a part of the said contact surface.

8. A current collector shoe having upstanding spaced flanges forming an elongated groove with an elongated contact surface to engage a trolley wire, comprising a body having an elongated slot opening into the groove, a separately formed insert positioned in the slot and having an exposed surface forming a portion of said contact surface, transversely disposed receptacles formed in said insert to the full width of the insert and opening onto said contact surface for the reception of a lubricant for the trolley wire, means to hold the insert in the slot, lubricating material positioned in said receptacle and a transverse hook at one end of the body to coact with means on a support and a threaded boss on the other end to receive holding means to detachably secure the shoe to the support.

9. A current collecting shoe having an elongated grooved contact surface to engage a trolley wire, comprising a body of metal, a separately formed insert of metal secured to the body and having an exposed surface forming part of the said contact surface, spaced recesses formed in the insert and extending for the full dimension of the insert in the direction in which the recesses extend and opening onto the said contact surface, and a lubricating material positioned in said recesses and forming part of said contact surface.

10. The method of manufacturing a current collector shoe having a contact surface to engage a conductor which comprises forming a shoe body of metal, providing a slot opening onto the contact surface, then forming a metal insert with alternately disposed transverse slots and barriers for the width of the insert and opening onto the contact surface, then positioning the insert in the slot with the exposed surface of the barriers in surface alignment with the contact surface and forming a part thereof, then filling the slots in the insert with a lubricating material.

FRED L. WOLF.